Aug. 26, 1952 W. G. HOELSCHER 2,608,120
PAWL AND RATCHET MECHANISM FOR TAILSTOCKS
Filed Sept. 8, 1948 3 Sheets-Sheet 1

INVENTOR.
William G. Hoelscher
BY
Wood Arey Herron & Evans
ATTORNEYS.

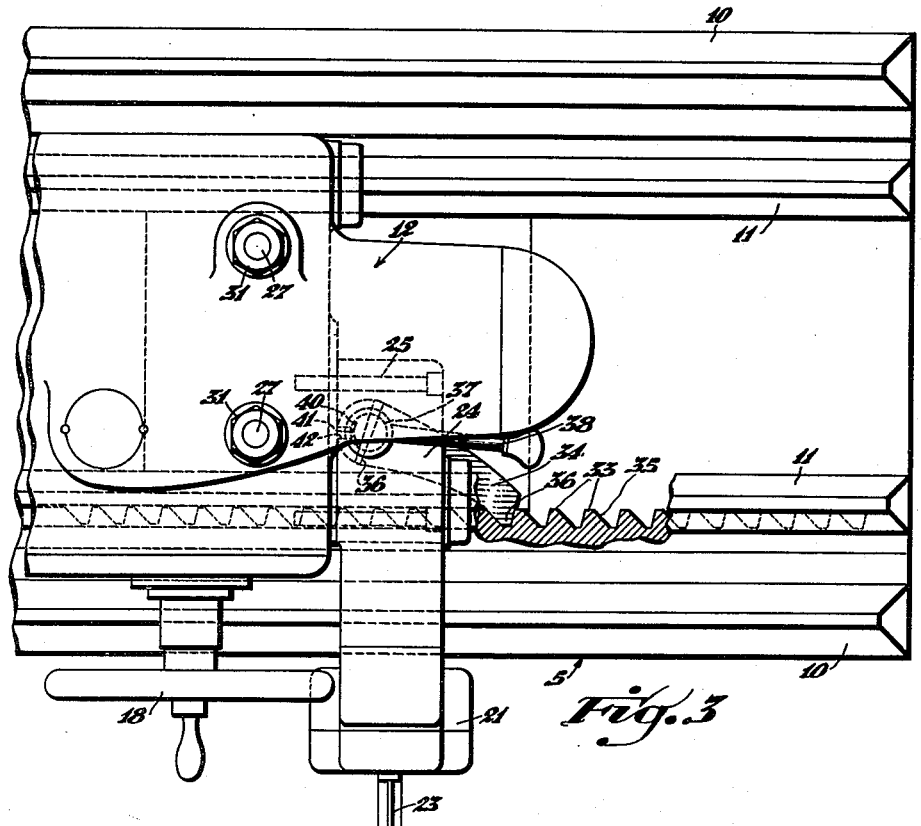

Patented Aug. 26, 1952

2,608,120

UNITED STATES PATENT OFFICE 2,608,120

PAWL AND RATCHET MECHANISM FOR LATHE TAILSTOCKS

William G. Hoelscher, Cincinnati, Ohio, assignor to The American Tool Works Company, Cincinnati, Ohio, a corporation of Ohio Application September 8, 1948, Serial No. 48,248

2 Claims. (Cl. 82—31)

This invention relates to lathes and more particularly to the construction of the bed and tail stock to provide an improved arrangement for latching the tail stock to the bed and to simplify the bed structure.

In setting up a lathe for operation, it is necessary to adjust the tail stock center longitudinally so that the work may be engaged between the head and tail stock centers. Where the variation in work length is slight, the tail stock center may be adjusted longitudinally relative to the tail stock to engage the work. When the variation is greater than the adjustment range of the center however, it is necessary to shift the tail stock bodily to a position approximating the end of the work and the center then is adjusted to establish the bearing engagement. To permit tail stock adjustment, the tail stock is mounted slidably upon the bed and clamping means are provided to clamp it in selected position. In conjunction with these clamping devices, it is customary to provide a series of ratchet teeth in the bed and to equip the tail stock with a pawl or similar latching device to establish a positive lock between the tail stock and bed. This arrangement resists positively the thrust of the work against the tail stock center to prevent the tail stock from shifting under vibration and impacts.

An example of past practice was to locate the ratchet teeth approximately in the center of the bed facing upwardly, with a pawl arranged to swing into and out of engagement with the teeth. This gives rise to considerable difficulty because of chips and cuttings accumulating in the teeth interfering with proper engagement of the pawl. This arrangement has the further disadvantage of presenting an obstruction to the opening between the ways, interfering with the free discharge of chips and making the cleaning of the lathe more difficult.

The present invention is predicated upon the concept of forming the ratchet teeth directly in the side wall of the lathe bed immediately beneath one of the ways so that the way overhangs the teeth to keep them clear of chips and to provide in cooperation with the teeth, a pawl which swings in a horizontal path and remains in disengaged position until manually engaged. The pawl swings in a horizontal plane so as to be unaffected by gravity and is connected to an actuating lever by means of which it may selectively be swung to an engaging or disengaging position for convenience in shifting the tail stock.

A primary object of the invention has been to provide a lathe bed having chip discharge chutes formed between the ways and having ratchet teeth located at one side of the chutes in such position that the teeth are protected from dirt and chips, leaving the central portion of the bed clear and unobstructed for the free discharge of chips and cuttings.

Another object has been to simply the lathe bed structure by forming ratchet teeth directly in one of the side walls thereby utilizing the side wall to provide a rigid backing for the teeth.

A further object has been to provide a simplified mounting and operating mechanism which retains the pawl in a selected rack engaging or disengaging position for convenience in adjusting the tail stock.

Further objects and salient features of the invention will be more fully disclosed in the specification in conjunction with the drawings.

In the drawings:

Figure 3 is a fragmentary top plan view of the lathe bed and tail stock, further illustrating the pawl and ratchet structure.

Figure 4 is an enlarged fragmentary sectional view taken on line 4—4, Figure 3 further illustrating the structural details of the pawl and ratchet arrangement.

Figure 1:
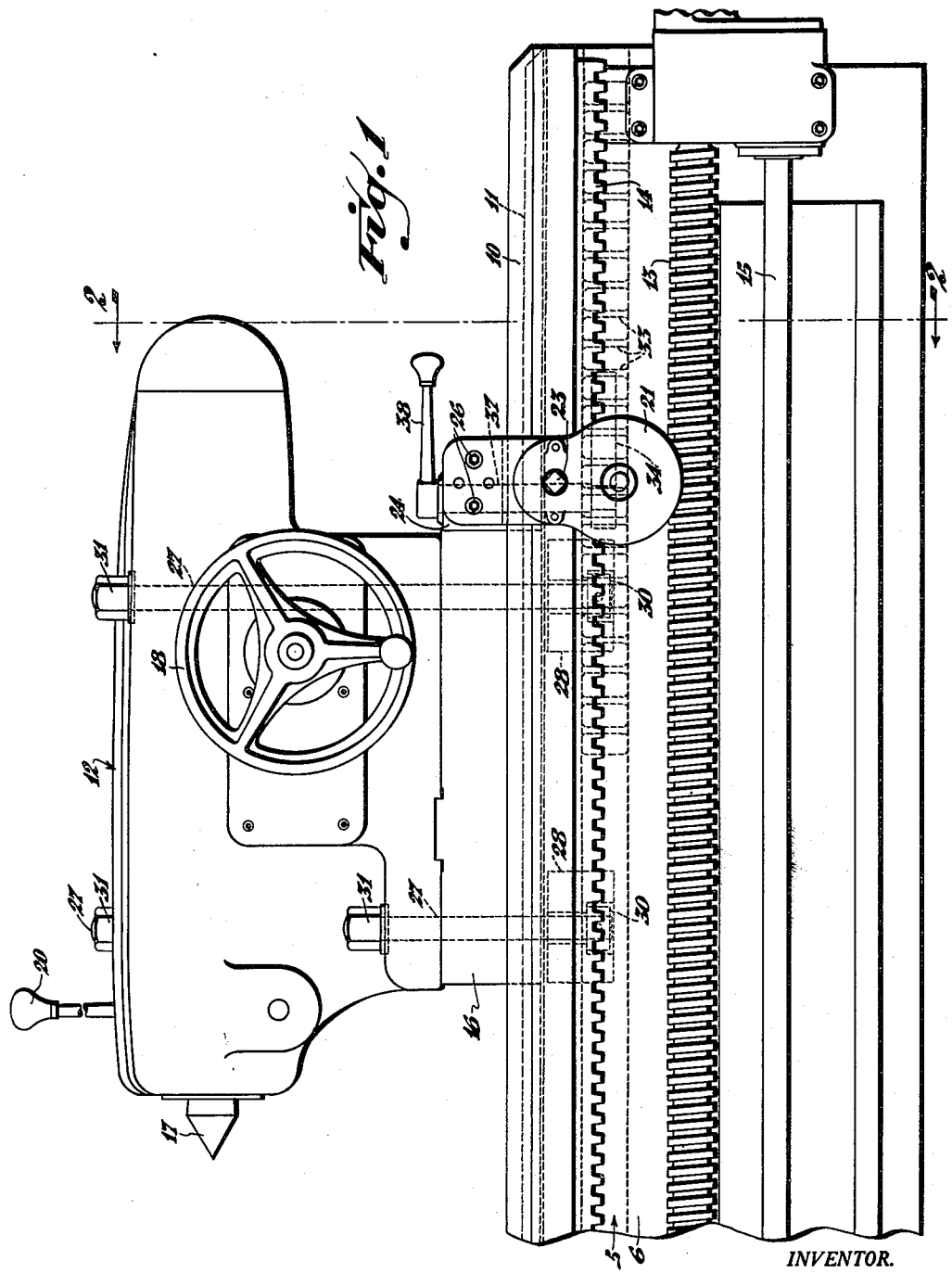
Figure 1 is a fragmentary side elevation of the tail stock portion of a lathe, illustrating generally the improved tail stock and ratchet structure in conjunction with the lathe bed.
Figure 2:
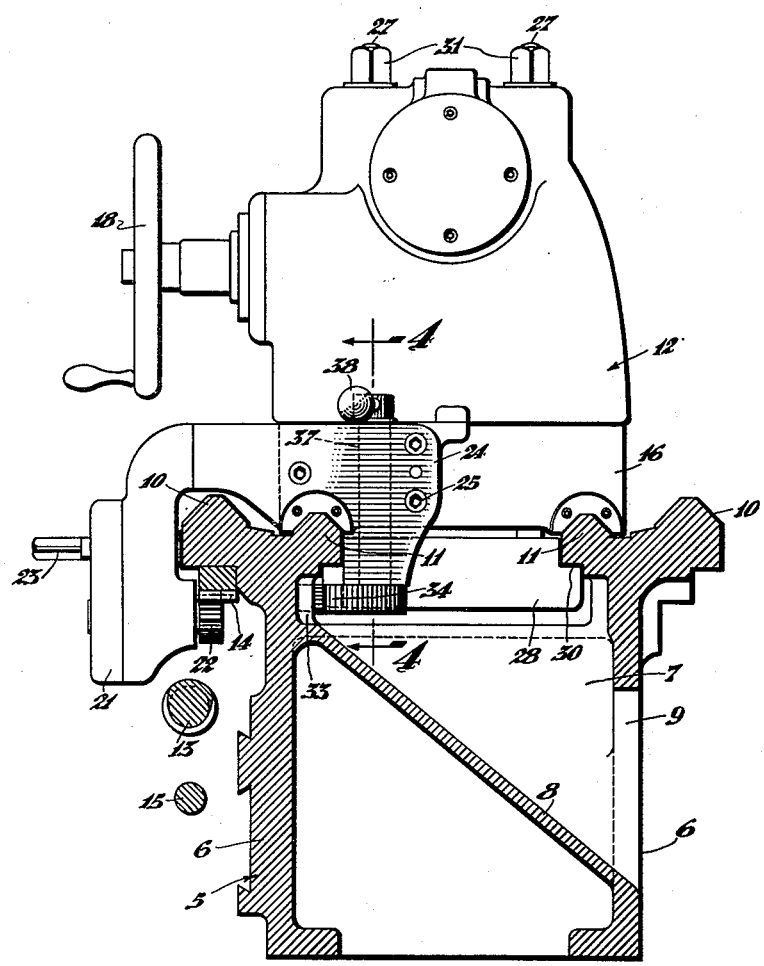
Figure 2 is a sectional view taken on line 2—2, Figure 1.

Referring to Figures 1 and 2, the lathe bed, indicated generally at 5, includes a pair of side walls 6—6 connected together by a series of girths or transverse sections 7. A series of inclined chip chutes 8 is located between the girths and extend rearwardly to guide the chips and cuttings for discharge through the openings 9 at the rear of the lathe bed. The upper edges of the respective side walls 6—6 each include an outer way or V 10 and an inner way 11 overhanging the respective walls 6. The tail stock, generally indicated at 12, is slidably mounted upon the inner set of ways 11 and the outer ways 10 slidably support the lathe carriage (not shown) in the usual manner. The lathe bed further is equipped with the usual lead screw 13, rack 14 and feed rod 15 for power translation of the carriage.

The tail stock 12 includes a slide block 16 mounted for longitudinal movement upon the inner ways 11, the tail stock being adjustable transversely in the usual manner relative to the block 16 so that its center 17 may be lined up with the head stock center to position the work in parallelism with the bed ways. The tail stock includes the usual hand wheel 18 arranged to extend or retract the center relative to the tail stock to engage the work. A hand lever 20, following the usual practice, is provided to clamp the center 17 in its adjusted position.

Mounted at the rear end of block 16 is a gear box 21 having reduction gearing which meshes with the rack 14 to shift the tail stock assembly 12 longitudinally relative to the ways 11. As shown in Figure 2, the gear box includes a pinion 22 meshing with the rack, the gear train being actuated by means of a detachable crank (not shown) which may be slipped upon the squared shaft 23. Rotation of shaft 23 drives the reduction gearing and pinion 22 to translate the tail stock conveniently to its selected position. The gear box is mounted upon a bracket 24 secured by screws 25 to the rear face of slide block 16. Bracket 24 overhangs the ways 10 and 11 and the gear box is secured to the end of bracket 24 by means of screws 26.

The tail stock is clamped to the ways 11 by means of screwthreaded studs 27 extending through the tail stock into clamping blocks 28—28 engaged against a shoulder 30 formed beneath the respective ways 11. As shown in Figure 4, the lower ends of studs 27 are anchored in the clamping blocks 28 by means of nuts 30 which are countersunk in the lower surface of the blocks 28. Nuts 31 are screwthreaded upon the upper ends of the studs 27 to clamp the tail stock firmly to the ways.

Referring to Figures 2 and 3, the rearward end of the lathe bed is provided with a series of ratchet teeth 33 which preferably are cast as an integral part of the bed. As viewed in Figure 2, these teeth are formed in the left hand side wall 6 directly beneath the overhanging inner way 11 and cooperate with a pawl 34 to establish a wedging engagement between the tail stock and bed to lock the tail stock against rearward movement. Teeth 33 are of buttress form facing toward the head stock end of the bed, having their rearward faces inclined as at 35 to provide automatic disengagement of the pawl when the tail stock is advanced toward the head stock. The swinging end 36 of the pawl 34 is shaped to fit snugly between the teeth as shown.

The pawl 34 swings in a horizontal plane relative to the ratchet teeth 33. For this purpose it is pinned as at 36 to the lower end of a vertical shaft 37 which is journalled in a bore passing through the bracket 24. An operating lever 38 is secured to the upper end of shaft 37 and maintains the shaft against longitudinal displacement. Actuation of handle 38 swings the pawl into and out of engagement with the ratchet teeth 33. In order to control the degree of swing, shaft 37 is provided with an arcuate groove 40 (Figures 3 and 4) which is engaged by a stud 41 formed at the end of a set screw 42. The screw 42 is in screwthreaded engagement in bracket 24 with the stud engaged in groove 40. The opposite ends of groove 40 engage the stud 41 at the opposite swing limits of the pawl.

When it is necessary to shift the head stock, the nuts 31 first are unscrewed to loosen the clamp blocks 28. If the tail stock is to be shifted rearwardly, handle 38 is operated to swing the pawl out of engagement with the teeth 33. The crank then is engaged upon shaft 23 and rotated in the direction to shift the tail stock rearwardly. If the tail stock is to be moved forwardly, it is unnecessary to uncouple the pawl since it will ride automatically out of engagement with the ratchet teeth. After the tail stock is shifted to its new position, lever 38 is actuated to reengage the pawl with the ratchet teeth to reestablish the wedging engagement between the teeth and the tail stock. The nuts 31 thereupon are tightened to clamp the tail stock firmly upon its rails 11.

It will be observed that by arranging the pawl to swing in a horizontal direction relative to its teeth, the pawl will remain in disengaged position and the head stock may be shifted rearwardly or forwardly without interference, until the hand lever 38 is actuated to engage the pawl. By forming the ratchet teeth 33 beneath the overhanging inner way 11, the way performs its normal function and additionally protects the teeth from chips and particles of metal so that there is no interference with the proper engagement by the pawl. This location of the teeth further provides a clear span between the ways 11—11, opening directly to the chip chutes 8 so that there is no interference with chip disposal. The bed thus may be kept clean and free of chips and particles with a minimum of effort. By utilizing the side wall to provide a backing for the ratchet teeth, the usual rack rail or rib is eliminated from the bed casting, thus simplifying the design and reducing costs.

Having described my invention, I claim:

1. In a lathe or the like, a longitudinal bed having a pair of spaced vertical side walls, a horizontal slide way formed along the upper edge of each of said side walls, one of said slide ways transversely overhanging the inner surface of the side wall upon which it is formed, a tail stock slidably mounted upon said slide ways, a horizontal row of ratchet teeth disposed beneath said transversely overhanging slide way in parallelism therewith, said teeth extending horizontally from the side wall and being formed as an integral part of the side wall adjoining the transversely overhanging slide way and in profile having working faces projecting substantially at right angles from the inner surface of the vertical side wall, the teeth in cross section having a substantial width and being disposed vertically, and a pawl mounted upon the tail stock and arranged to swing in a horizontal plane common to the plane of the horizontally extending ratchet teeth for engaging and disengaging the ratchet teeth.

2. In a lathe or the like, a longitudinal bed having a pair of spaced vertical side walls, a horizontal slide way formed along the upper edge of each of said side walls, one of said slide ways transversely overhanging the inner surface of the side wall upon which it is formed, a tail stock slidably mounted upon said slide ways, a horizontal row of ratchet teeth disposed beneath said transversely overhanging slideway in parallelism therewith, said ratchet teeth extending horizontally from the side wall and being formed as an integral part of the side wall adjoining the transversely overhanging slide way and in profile having working faces projecting substantially at right angles from the inner surface of the vertical side wall, a bracket secured upon the tailstock, said bracket being extended downwardly adjacent the overhanging slide way substantially to the plane of the horizontally extending ratchet teeth, a vertical shaft rotatably mounted in said bracket, a pawl secured upon the lower end of said shaft in a position to swing in a horizontal plane with respect to the ratchet teeth for engagement therewith, and an actuating lever secured upon the upper end of said shaft for engaging and disengaging the pawl with respect to the ratchet teeth.

WILLIAM G. HOELSCHER.

REFERENCES CITED

The following references are of record in the file of this patent:

UNITED STATES PATENTS

| Number | Name | Date |
|---|---|---|
| 73,542 | Maxey | Jan. 21, 1868 |
| 1,556,161 | Ripberger | Oct. 6, 1925 |
| 1,664,757 | Randolph | Apr. 3, 1928 |
| 1,968,255 | Lewis | July 31, 1934 |
| 2,033,406 | Vancil | Mar. 10, 1936 |